United States Patent [19]
Dreyer

[11] 3,942,702
[45] Mar. 9, 1976

[54] CORRUGATED TUBING

[75] Inventor: Marco Dreyer, Lucerne, Switzerland

[73] Assignee: Boa AG Luzern, Lucerne, Switzerland

[22] Filed: Mar. 29, 1974

[21] Appl. No.: 455,963

[30] Foreign Application Priority Data
Mar. 29, 1973 Switzerland.......................... 4565/73

[52] U.S. Cl................................. 228/145; 29/454
[51] Int. Cl.² ........................................ B23P 19/04
[58] Field of Search ........... 29/476.5, 454; 228/144, 228/145; 138/120–122, 118, 129, 137

[56] References Cited
UNITED STATES PATENTS

| | | | |
|---|---|---|---|
| 1,547,431 | 7/1925 | Mallory | 138/121 |
| 1,964,289 | 6/1934 | Harrah | 29/454 |
| 1,978,529 | 10/1934 | Harrah | 29/454 |
| 2,358,291 | 9/1944 | Fentress | 29/454 |
| 2,741,024 | 4/1956 | Breuer | 29/454 |
| 3,063,142 | 11/1962 | Kroon | 29/454 |
| 3,330,303 | 7/1967 | Fochler | 138/120 |
| 3,534,123 | 12/1950 | Hasselhorn | 29/454 |

Primary Examiner—Al Lawrence Smith
Assistant Examiner—Robert C. Watson
Attorney, Agent, or Firm—Edward J. Brenner

[57] ABSTRACT

A method of producing a corrugated flexible tube wherein a corrugated profiled strip having multiple corrugations is wound in a helical path such that its edges overlap and then the overlapped edges are tight welded together, preferably by electrical resistance welding, such that every welded corrugation of the resultant corrugated flexible tube is followed by at least one unwelded corrugation.

8 Claims, 5 Drawing Figures

CORRUGATED TUBING

The present invention relates to a method of producing a corrugated pipe from a profiled strip which is helically wound and continously soldered or welded on the marginal portion contacting or overlapping each other. To convey gases and liquids through a pressure tight pipe, corrugated tubes or flexible tubing which are manufactured from a profiled strip and those marginal portions are overlapped and soldered or welded to each other are known. The profiled strip contains in the direction of its length only one corrugation. The edges of the strip overlapping each other form the top of the corrugation which through its overlapping contains a double wall which is soldered or welded.

Such well known corrugated pipe for many application has rather important problem as each top of the corrugation has a double wall and each bottom of the corrugation only one wall, the self-resistance of the outside wall of the corrugation against a radial bending being greater than the self-resistance of the inside wall of the corrugation. The flexibility of such a corrugated pipe is therefore non homogeneous. In any case the double wall of the top of the corrugation increases the weight of the corrugated pipe. There is naturally a possibility to reduce the weight of such a corrugated pipe by a smaller corrugation or a greater distance from one corrugation to the other. But in special application such as for aircraft, even a such reduced weight is too big as in the aircraft flexible pipe of very light weight are very important.

In many applications there is only a restricted flexibility necessary, as sample we can enumerate corrugated pipes to be used only for correcting the differences of fitting the pipe, such as in pipes to be connected with machinery or other technical installations, and which are only in motion just for installation purposes or for cleaning purposes. With the known corrugated tubing a difference in flexibility can only be obtained in very small limits.

An other problem of the known corrugated tubes is the very slow speed of manufacturing and the small production capacity as the overlapping edges of the strip which are forming the top of the corrugation has to be welded or soldered by electrical resistant welding on their total length of the top of the corrugation. For a few feet of corrugated tube one needs a weld of a multiple of its length which involves the risk of leaks from time to time.

To prevent the described problems the method according to the present invention provides that to the welded corrugation is added at least an unwelded corrugation. For this purpose the profiled strip is provided with several corrugations of a identical or different height of the corrugation. According to this method the edges of the strip are also bent and after having been wound on a mandrel with one edge overlapping the other one to form the double walled top of the corrugation, they are welded with an electrical resistance-welding or with an other welding method. If the welded portion has the same profile form as the corrugations which are made by profiling the strip, one corrugation is practically indistinguishable from the other. In such a design all corrugations can have absolutely the same bending radius. If the corrugations which are manufactured by profiling a strip, are smaller or larger than the corrugations which are constructed by overlapping the edges of the strip, then the corrugated tubes contain unequal corrugations, and the flexibility of the corrugated tube can be determined in advance by calculated methods. An other characteristic consists in that, that the edges which are overlapping to form the welded corrugation can be formed with a lesser stiffness, such that the increase of stiffness due of the overlapping of two edges can be balanced in regard to the other corrugations which are not overlapped and not welded and made by profiling the strip. The edges of the strip which are bent to be overlapped may be for example higher and/or manufactured with greater radius. The overlapping of the edges therefore does not reduce the homogeneity of the bending and motion capacity of the corrugated tube.

The corrugated tube according to this invention can be manufactured with much greater production speed than is possible for a corrugated tube on which each top of the corrugation is overlapped and welded. Employing the same speed of winding and welding the produced quantity of corrugated tube is double or multiple according as the profiled strip contains one or several finished corrugations. Such a method of increasing a production capacity without any other technical installation and only by a new method of construction produces a very important economical advantage.

Welding without any faults is required for the tube to be gas- and vacuum tight. A welding with faults which cannot be absolutely excluded, may result in a leakage on the points of the faults. The welding in itself may therefore be a source of faults, for the flexible corrugated tubing. Reducing the length of the welding of a corrugated tube in comparison with another of the same length can therefore increase the security of tightness and therefore also the safety of service.

Opposite to corrugated tubes on which the connection of the edges are only made by folding, the welding connection has the big advantage not only of the smaller weight but of the absolute tightness, by the effect that the edges of the strip have not to be bent several times and folded one in the other, but that for the welding of the edges a simple overlapping is sufficient, the reduction of the weight is essential, particularly as such corrugated tubes are normally used in great diameters. Also transport and installation of such corrugated tube are much easier.

The extremely high tensile strength subject to the welded connection of the edges of the strip is of great importance especially when the corrugated tube is installed vertically or if for other reasons the corrugated tube is exposed to great tensions. In regard to the quality characteristics the welded corrugated tubing is highly superior to a folded corrugated tubing. Following the method of the invention the tightness of the corrugated welded tubing can at each position and in any time be granted and increases the safety in operation in comparison with the folded corrugated tubing. On the application of the welded tubing, for instance in ventilation and heating installations, the absolute tightness of the tubing prevents liquids of condensation from finding their way from the inside of the pipe to the outside and therefore, a corrosion of the flexible tubing and a damage of the brickwork around the flexible tubing cannot be possible. Such folded tubing is especially adapted to restore chimneys of smaller or medium heating installations.

The experience has shown that in certain cases of fuel heating the sulphuric acids, which develop in the chimney, forces their way through the folder of the corrugated tube and can increase corrosion of the corrugated tube as well as damage the brickwork of the chimney. On the other side in gas heatings leakages on the folder of the flexible tubing may permit gas to penetrate through the brickwork of the chimney and cause an unpleasent scent.

In accordance with the present invention these two problems can absolutely be excluded, as no other flexible corrugated tube known until today on the market can produce a similar tightness; the product of the invention provides a very important technical advantage.

The method according to the invention will now be described with references to FIGS. 1 to 5 of the accompagning drawings.

Figure 1:
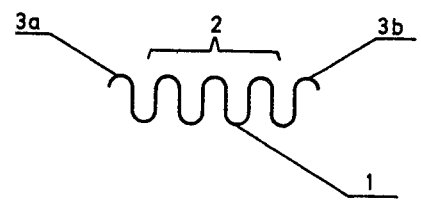
FIG. 1 shows a profiled strip for manufacturing the corrugated tube, subject of the invention.

The profiled strip 1 as shown in FIG. 1 includes 3 corrugations in the middle of the strip 2.

Figure 2:
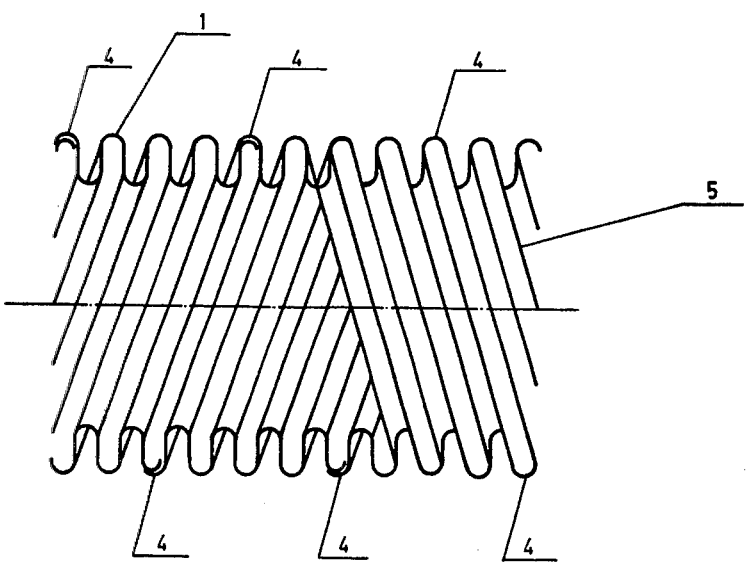
FIG. 2 shows a corrugated flexible tubing manufactured with a profiled strip as shown in FIG. 1.

The edges 3a and 3b are bent of half a corrugation. The profiled strip 1 can be wound helically on a mandrel in a manner that the edges 3a and 3b are overlapping and can be welded by electrically welding resistance, welding to a corrugation 4, and in this manner an absolutely gas- and vacuum tight corrugated tube 5 is manufactured as showed in FIG. 2, on which the left half part of tubing shows its section.

The corrugated tubing 5 contains in between two welded corrugations various unwelded corrugations. The number of the unwelded corrugations of the middle part 2 will be adapted according to the form of the profile and the diameter of the flexible tubing.

Figure 3:
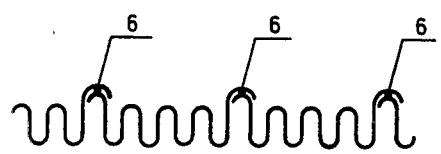
FIG. 3 shows a corrugated tubing manufactured from a profiled strip with corrugations of different shape.

FIG. 3 shows a corrugated tubing, in which in the profiled strip there are in the middle part 3 formed smaller corrugations of one ply, than the corrugations obtained by overlapping and welding the edges of the strip. In this way a flexible tubing of very homogenious flexibility of all corrugations will be produced from the 3 formed closed corrugations as well as on the welded corrugations. Because the increase of the stiffness due to the double walls of the welded corrugations can be reduced by the greater radius of a value which nearly conforms to the stiffness of the non welded corrugations of one ply with a smaller radius and a lower side of the corrugations. The two different forms of the corrugations therefore have the same characteristics of flexibility. The preformed non welded corrugations of the middle part of the strip can be even lower and closer if one desires an increase of the stiffness and of the tensile strength of the corrugated tube.

Figure 4:
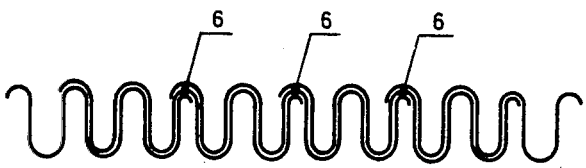
FIG. 4 shows a corrugated tubing of double wall with high corrugations.

A double walled corrugated tube as shown in FIG. 4 can be manufactured in the manner that a profiled strip is wound overlapping itself totally but only is welded on the edges of the strip 6. In this case a double walled flexible tubing is formed which is welded on each second corrugation as shown in FIG. 4 and in between of each welded corrugation there is non welded corrugation.

Figure 5:
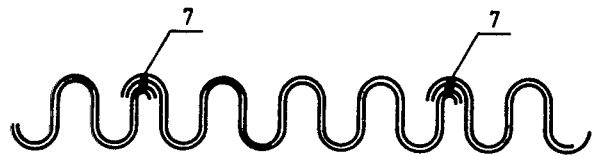
FIG. 5 shows a double walled corrugated tubing of smaller corrugations of a similar method or as FIG. 4.

FIG. 5 shows an other alternative, on which instead of one single strip two or several strips are wound each over the other and are welded on the edges. In this way a multiple corrugated tube can be manufactured with a higher pressure capacity, the flexibility being still, the same.

On such corrugated tubes of 2 or more plies the single ply can consists on different metals or alloys or of different thickness of the strip according to the proposed application. Such constructions of tubing can also be provided to get a difference in electrical resistance, of difference of heat conduction, of different resistance of corrosion.

I claim:

1. A method of producing a helically corrugated flexible tube which comprises winding a corrugated profiled strip in a helical path such that the edges of said strip overlap and then welding together the overlapped edges, wherein every welded corrugation of the resultant corrugated flexible tube is followed by at least one unwelded corrugation and wherein the corrugations that are welded together have less stiffness than the other corrugations to thereby reduce the stiffness resulting from the overlapping of the edges of said strip.

2. The method of claim 1 wherein the overlapped edges are tight welded by electrical resistance welding.

3. The method of claim 1, wherein the welded corrugations have the same profile as the unwelded corrugations.

4. The method of claim 1 wherein the corrugated flexible tube has a wall consisting of several plies.

5. As an article of manufacture, a helically corrugated flexible tube comprising a corrugated and helically wound strip having the edges of said strip overlapped and welded together wherein every welded corrugation thereof is followed by at least one unwelded corrugation and wherein the corrugations that are welded together have less stiffness than the other corrugations to thereby reduce the stiffness resulting from the overlapping of the edges of said strip.

6. The article of claim 5 wherein the welded corrugations have the same profile as the unwelded corrugations.

7. The article of claim 5 wherein the corrugated flexible tube has a wall consisting of several plies.

8. The article of claim 5 wherein said strip has multiple corrugations and every welded corrugation is followed by at least two unwelded corrugations.

* * * * *